(12) United States Patent
Kinoshita et al.

(10) Patent No.: US 10,115,949 B2
(45) Date of Patent: Oct. 30, 2018

(54) LITHIUM SECONDARY BATTERY

(75) Inventors: Koji Kinoshita, Toyota (JP); Takayuki Shirane, Okazaki (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 311 days.

(21) Appl. No.: 14/366,284

(22) PCT Filed: Dec. 19, 2011

(86) PCT No.: PCT/JP2011/079416
§ 371 (c)(1),
(2), (4) Date: Nov. 4, 2014

(87) PCT Pub. No.: WO2013/094004
PCT Pub. Date: Jun. 27, 2013

(65) Prior Publication Data
US 2015/0050541 A1 Feb. 19, 2015

(51) Int. Cl.
*H01M 2/16* (2006.01)
*H01M 10/052* (2010.01)
(Continued)

(52) U.S. Cl.
CPC ......... *H01M 2/1686* (2013.01); *H01M 2/166* (2013.01); *H01M 2/1646* (2013.01); *H01M 2/1653* (2013.01); *H01M 4/587* (2013.01); *H01M 10/052* (2013.01); *H01M 10/0525* (2013.01); *H01M 10/0587* (2013.01); *H01M 10/4235* (2013.01); *H01M 2/145* (2013.01);
(Continued)

(58) Field of Classification Search
CPC ... H01M 2/1686; H01M 2/166; H01M 10/052

USPC .......................................................... 429/144
See application file for complete search history.

(56) References Cited

U.S. PATENT DOCUMENTS

| 2002/0055039 A1* | 5/2002 | Seung | C07C 323/20 429/213 |
| 2005/0031942 A1* | 2/2005 | Hennige | H01M 2/1613 429/144 |

(Continued)

FOREIGN PATENT DOCUMENTS

| CN | 101517783 A | 8/2009 |
| JP | 2004-14127 | 1/2004 |

*Primary Examiner* — Osei K Amponsah
(74) *Attorney, Agent, or Firm* — Finnegan, Henderson, Farabow, Garrett & Dunner, LLP (57) ABSTRACT

This invention provides a lithium secondary battery which degrades less upon high-rate charge/discharge cycles (thus durable). The lithium secondary battery comprises positive electrode 10 having positive electrode active material layer 14, negative electrode 20 having negative electrode active material layer 24, organic porous material layer 32 placed between positive electrode active material layer 14 and negative electrode active material layer 24, inorganic porous material layer 34 placed between organic porous material layer 32 and negative electrode active material layer 24. Inorganic porous material layer 34 comprises an inorganic filler that does not store lithium at a potential higher than the lithium-storing potential of the negative electrode active material layer, and a Li absorber that irreversibly stores lithium at a potential higher than the lithium-storing potential.

12 Claims, 3 Drawing Sheets

(51) Int. Cl.
*H01M 10/42* (2006.01)
*H01M 4/587* (2010.01)
*H01M 10/0525* (2010.01)
*H01M 10/0587* (2010.01)
H01M 4/505 (2010.01)
H01M 4/525 (2010.01)
H01M 2/14 (2006.01)

(52) U.S. Cl.
CPC ............ *H01M 4/505* (2013.01); *H01M 4/525* (2013.01); *H01M 2220/20* (2013.01); *Y02E 60/122* (2013.01)

(56) References Cited

U.S. PATENT DOCUMENTS

| | | | |
|---|---|---|---|
| 2006/0008700 A1* | 1/2006 | Yong | H01M 2/1653 429/144 |
| 2008/0020283 A1* | 1/2008 | Miyashiro | B82Y 30/00 429/322 |
| 2010/0285371 A1 | 11/2010 | Lee et al. | |
| 2011/0269010 A1* | 11/2011 | Sawaguchi | B82Y 30/00 429/144 |

* cited by examiner

LITHIUM SECONDARY BATTERY

CROSS-REFERENCE TO RELATED APPLICATIONS

This application is a national phase application of International Application No. PCT/JP2011/079416, filed Dec. 19, 2011, the content of which is incorporated herein by reference.

TECHNICAL FIELD

The present invention relates to a lithium secondary battery.

BACKGROUND ART

Lithium secondary batteries are used as power supplies loaded on electrically-driven vehicles, or as power sources installed in PCs and other mobile terminals, etc. In particular, lightweight lithium-ion secondary batteries with high energy densities are becoming increasingly important as high-power power supplies loaded on vehicles (e.g. power sources for driving motors connected to drive vehicle wheels).

A typical lithium secondary battery includes a separator which separates a positive electrode active material layer and a negative electrode active material layer. The separator prevents a short circuit associated with direct contact between these two active material layers, and with the pores of the separator being impregnated with an electrolyte solution, it also serves to form ion-conducting paths (conduction channels) between the two electrodes. Typical examples of a separator used in a general lithium secondary battery include a single-layer or multi-layer porous sheet formed with thermoplastic resin (typically with a polyester or a polyolefin such as polypropyelene, etc.). A separator formed from such a porous resin sheet may provide, in addition to the short-circuit prevention, a feature (shutdown function) to block ion-conducting paths when the internal temperature of the battery is elevated to a certain temperature range (typically the melting point (or softening point) of the separator) so as to stop charging and discharging to prevent a further temperature increase. The ion-conducting paths are blocked when fine pores of the separator shut as it melts or softens.

A separator formed from a porous resin sheet as described above undergoes thermal contraction when the temperature reaches a point where the shutdown function is activated. When a great deal of thermal contraction occurs, a local tensile stress may be applied to the sheet to open a hole or the surface area of the sheet may shrink, possibly causing the two electrodes to contact each other to form a new short-circuit spot. Regarding a heat-resistant separator having an inorganic oxide porous membrane on a surface of organic porous film, Patent Document 1 states that the heat-resistant separator provides a shutdown function by means of the organic porous film and it also maintains insulation by means of the inorganic oxide porous membrane even when the organic porous film melts down.

CITATION LIST

Patent Literature

[Patent Document 1] Japanese Patent Application Publication No. 2004-014127

SUMMARY OF INVENTION

Technical Problem

Generally, in a lithium secondary battery, the resistance of the positive electrode active material is higher than the resistance of the negative electrode active material, and thus a higher degree of polarization will occur during charging and discharging, causing the positive electrode to have a higher overvoltage than the negative electrode. Due to such an overvoltage, the apparent positive electrode potential detected will be higher during charging and lower during discharging. With increasing charge/discharge rate (increasing charge/discharge current), polarization will occur to a higher degree, making the positive electrode capacity smaller during high-rate charging and discharging as compared to during low-rate charging and discharging. On the other hand, the level of overvoltage (the degree of polarization) is smaller at the negative electrode as compared to at the positive electrode, and thus even at a higher charge/discharge rate, the decrease in the negative electrode capacity is relatively small (i.e. the charge/discharge rate dependence is small); and therefore, during high-rate charging and discharging, the difference between the negative electrode capacity and the positive electrode capacity (the value of the negative electrode capacity minus the positive electrode capacity) tends to be larger. Due to such a capacity difference between a positive electrode and a negative electrode, for example, a battery that has been discharged at a high rate until it reaches a prescribed discharge termination voltage may have a large amount of lithium remaining in the negative electrode active material as compared to when discharged at a low rate. When a large amount of lithium remains in the negative electrode active material, the capacity of the negative electrode active material to accept Li may decrease during charging and the battery may suffer degradation (reduced performance).

An objective of the present invention is to provide a lithium secondary battery that is less likely to degrade even after subjected to high-rate charge/discharge cycles (having good durability). Another objective is to provide a method for producing such a lithium secondary battery.

Solution to Problem

The lithium secondary battery according to the present invention comprises a positive electrode having a positive electrode active material layer and a negative electrode having a negative electrode active material layer. It further comprises an organic porous material layer placed between the positive electrode active material layer and the negative electrode active material layer, and an inorganic porous material layer placed between the organic porous material layer and the negative electrode active material layer. The positive electrode active material layer comprises a positive electrode active material capable of reversibly storing and releasing lithium (Li). The negative electrode active material layer comprises a negative electrode active material capable of reversibly storing and releasing Li (e.g. a carbon material having a graphite structure at least partially). The inorganic porous material layer comprises an inorganic filler that does not store Li at a potential higher than at least the Li-storing potential of the negative electrode active material (typically 0.0 to 0.4 V relative to lithium metal (vs. Li/Li$^+$) when the negative electrode active material is a carbon material having a graphite structure). The inorganic porous material layer further comprises a material (Li absorber) that irreversibly stores Li at a potential higher than the Li-storing potential of the negative electrode active material.

In a lithium secondary battery having such a constitution, with a Li absorber placed on the negative electrode side of the battery, part of Li may be fixed (irreversibly stored) during charging (in typical, mainly during initial charging). This allows for adjustment of the balance between the positive electrode capacity and the negative electrode capacity in view of a situation involving high-rate charging or discharging (a charging/discharging condition where the positive electrode has a higher overvoltage). For example, even when discharged at a high rate, Li inside the negative electrode active material can be more efficiently released, and thus the amount of Li remaining in the negative electrode active material when the discharge termination voltage has been reached can be reduced. Accordingly, it can prevent or lessen reduction of the capacity of the negative electrode active material to accept Li during charging following high-rate discharging and suppress degradation (e.g. an increase in the resistance) of the secondary battery. The Li absorber is added to the inorganic filler and placed in the inorganic porous material layer, making it easy to put a suitable amount of the Li absorber.

In the lithium secondary battery according to the present invention, upon charging (in typical, mainly upon initial charging), part or all of the Li absorber may react with Li to form a product. Accordingly, the initially-charged lithium secondary battery can be understood to comprise the Li absorber and the product of the reaction with Li (typically a Li compound) in place of at least part (in typical, essentially all) of the Li absorber. In other words, the lithium secondary battery according to the present invention may comprise the Li absorber in a state before storing Li, in a state after storing Li, or in both the states before and after storing Li. Lithium secondary batteries comprising the Li absorber in such states are all included in the lithium secondary battery according to the present invention.

As the Li absorber, for instance, nickel oxide (NiO), carbon fluorides (CnF), manganese dioxide ($MnO_2$) and the like can be preferably used. Among these, one species can be used solely, or two or more species can be used in a certain combination.

As the inorganic filler, for instance, a filler formed of an inorganic oxide such as alumina, magnesia, titania, etc., can be preferably used. Among these, one species can be used solely, or two or more species can be used in a certain combination; or one, two or more species among these may be used along with other inorganic filler(s).

In a preferable embodiment of the lithium secondary battery disclosed herein, the positive electrode active material layer comprises, as the positive electrode active material, a lithium transition metal oxide having a layered structure. According to such an embodiment, the effects by applying the present invention can be produced to a greater extent and a high performance battery having excellent durability to high-rate charge/discharge cycles can be realized.

The amount of the Li absorber can be, for instance, 20 parts by mass or less (typically 0.5 to 20 parts by mass) relative to 100 parts by mass of the positive electrode active material. When the amount of the Li absorber is excessively large relative to the amount of the positive electrode active material, the initial battery capacity may tend to be low. When the amount of the Li absorber is excessively small, the effects of the Li absorber (e.g. an effect to increase the durability to high-rate charge/discharge cycles) may diminish.

The inorganic porous material layer should just be placed between the organic porous material layer and the negative electrode active material layer. For example, it may be in such a form that the inorganic porous material layer is retained on the negative electrode-facing surface of the organic porous material layer, in such a form that it is retained on the surface of the negative electrode active material layer, or in an independent sheet form, etc. In a preferable embodiment, the inorganic porous material layer is retained on the negative electrode-facing surface of the organic porous material layer. According to such an embodiment, the use of the inorganic porous material layer can increase the heat resistance of the organic porous material layer (e.g. thermal contraction is suppressed).

A lithium secondary battery having such a constitution can be preferably produced, for instance, by the next method. The method comprises obtaining a mixture comprising the inorganic filler and the Li absorber. It also comprises applying the mixture to at least a first surface of a porous resin sheet as the organic porous material layer to form a heat-resistant separator in which the inorganic porous material layer is retained on the first surface. It further comprises constructing a lithium secondary battery with the positive electrode, the negative electrode and the heat-resistant separator. Herein, the heat-resistant separator is placed so that the first surface faces the negative electrode. Thus, the lithium secondary battery made has a constitution where the inorganic porous material layer is retained on the negative electrode-facing surface of the organic porous material layer (porous resin sheet).

A lithium secondary battery disclosed herein can exhibit good durability even in a use mode involving high-rate charging or high-rate discharging as described above, and thus it is suitable, for instance, as a battery loaded on a vehicle. Therefore, the present invention can provide a vehicle (e.g. an automobile) comprising the lithium secondary battery, (typically a lithium-ion secondary battery) as a vehicle-driving power supply (typically as a power source in a hybrid vehicle or an electric vehicle).

In the present description, the term "lithium secondary battery" refers to a secondary battery that uses at least lithium ions as electrolytic ions (charge carrier) and achieves charging and discharging by transport of charges associated with lithium ions between the positive and negative electrodes. Secondary batteries generally called lithium-ion secondary batteries, lithium polymer batteries, etc., are typical examples included in the lithium secondary battery in the present description. The concept of the lithium secondary battery referred to herein encompasses a secondary battery using solely lithium ions as the charge carrier as well as a secondary battery using lithium ions and other chemical species (e.g. sodium ions) together as the charge carrier.

The term "active material" in the present description refers to a substance capable of reversibly storing and releasing (typically intercalating and deintercalating) a chemical species serving as a charge carrier in a secondary battery (e.g. lithium ions in a lithium-ion secondary battery).

DESCRIPTION OF EMBODIMENTS

While referencing to the drawings, a preferable embodiment of the present invention is described below. In the following drawings, members and sites providing the same effect are indicated by the same reference numeral. The dimensional relationships (of length, width, thickness, etc.) in each drawing do not reflect actual dimensional relationships. Matters necessary to practice this invention other than those specifically referred to in this description (e.g. production methods for positive electrode active materials and negative electrode active materials, compositions and production methods of electrolytes, general techniques for constructing batteries, etc.) may be understood as design matters based on the conventional art in the pertinent field to a person of ordinary skills in the art. The present invention can be practiced based on the contents disclosed in this description and common technical knowledge in the subject field.

While not intended to suggest any particular limitations, in the following, an embodiment of the present invention is described in detail using a lithium-ion secondary battery as an example.

Figure 1:
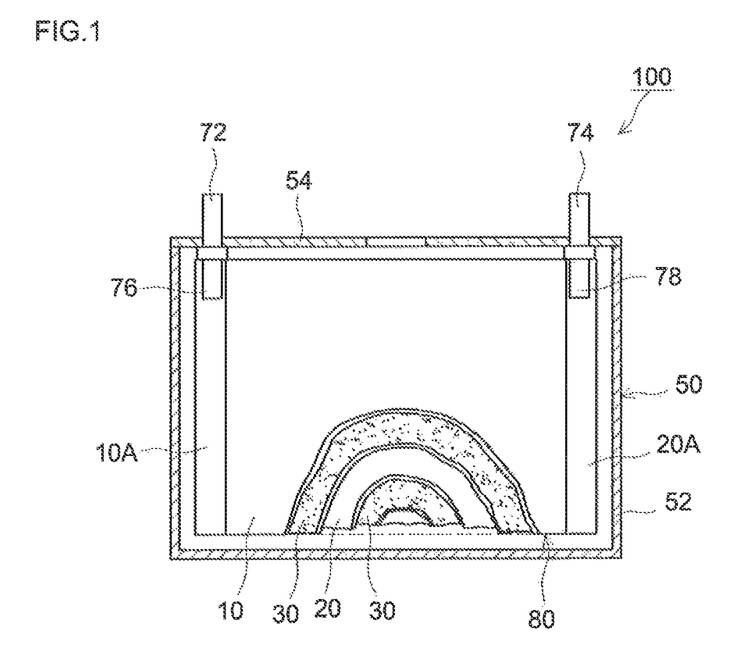
FIG. 1 shows a partial cross-sectional view schematically illustrating a lithium-ion secondary battery according to an embodiment.

FIG. 1 shows an outlined constitution of a lithium-ion secondary battery according to the present embodiment. The lithium-ion secondary battery 100 has a constitution in which an electrode body (wound electrode body) 80 in a form where a long positive electrode sheet 10 and a long negative electrode sheet 20 are wound with two long separator sheets 30 placed in between is contained along with a non-aqueous electrolyte (typically an electrolyte in the liquid phase at room temperature (around 25° C.), i.e. an electrolyte solution) in a battery case 50 having a shape (square shape) that can house wound electrode body 80.

Battery case 50 comprises a main casing 52 having a square shape which is open at the top and closed at the bottom, and a lid 54 to close the opening. As for the material constituting battery case 50, can be used metal materials such as aluminum, steel, stainless steel (SUS), Ni-plated SUS and the like. Alternatively, battery case 50 may be molded from a resin material such as polyphenylene sulfide (PPS), polyimide resin, etc. The upper surface (i.e. lid 54) of battery case 50 is provided with a positive terminal 72 electrically connected to positive electrode sheet (positive electrode) 10 in wound electrode body 80 as well as a negative terminal 74 electrically connected to negative electrode sheet (negative electrode) 20 in wound electrode body 80.

Figure 2:
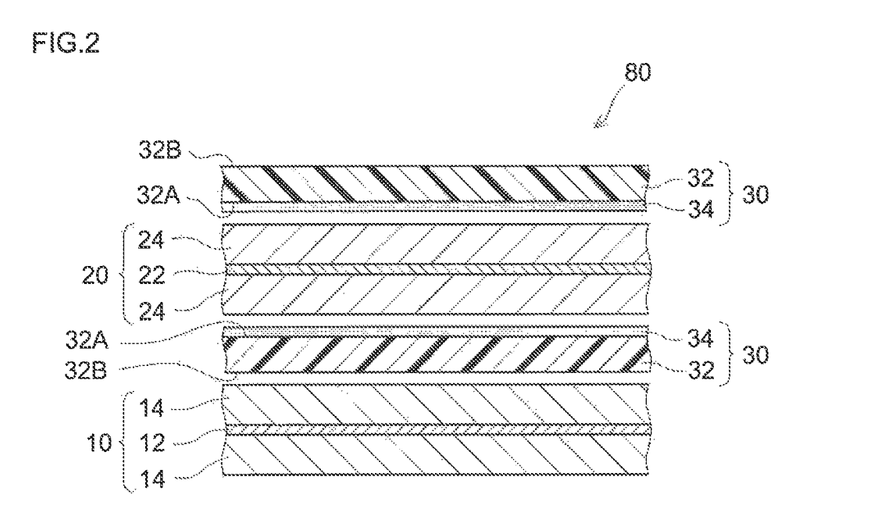
FIG. 2 shows a schematic cross-sectional view illustrating a main part of a lithium-ion secondary battery according to an embodiment.

As shown in FIG. 2, positive electrode sheet 10 has a structure such that a long positive current collector sheet 12 retains a positive electrode active material layer 14 on each face. As shown in FIG. 1, on a border along a side edge of the width direction of positive electrode sheet 10, a positive electrode active material layer-free portion 10A is provided, having no positive electrode active material layer 14 to expose positive current collector 12. Similarly to positive electrode sheet 10, negative electrode sheet 20 also has a structure where a long negative current collector 22 retains a negative electrode active material layer 24 on each face. On a border along a side edge of the width direction of negative electrode sheet 20, a negative electrode active material layer-free portion 20A is provided, having no negative electrode active material layer 24 to expose negative current collector 22.

As shown in FIG. 2, each of the two separator sheets 30 in the present embodiment is constituted as a heat-resistant separator, comprising an organic porous material layer 32 and an inorganic porous material layer 34 retained on a first surface 32A thereof. Each of the heat-resistant separator sheets 30 is placed so that inorganic porous material layer 34 faces negative electrode active material layer 24, or, in other words, the first surface 32A of organic porous material layer 32 faces negative electrode sheet 20 (via inorganic porous material layer 34). This results in a constitution in which organic porous material layer 32 is placed between positive electrode active material layer 14 and negative electrode active material layer 24 while inorganic porous material layer 34 is placed between organic porous material layer 32 and negative electrode active material layer 24. It is noted that in FIG. 2, to make the drawing intelligible, the respective sheets 10, 20 and 30 are spaced. In the actual electrode body 80, however, these sheets are stacked essentially without any gaps.

When fabricating wound electrode body 80, positive electrode sheet 10 and negative electrode sheet 20 are stacked via a separator sheet (heat-resistant separator) 30. Herein, as shown in FIG. 1, positive electrode sheet 10 and negative electrode sheet 20 are overlaid, yet slightly displaced in the width direction so that positive electrode active material layer-free portion 10A in positive electrode sheet 10 and negative electrode active material layer-free portion 20A in negative electrode sheet 20 run off the two sides of the width direction of separator sheets 30, respectively. By winding the sheets 10, 20 and 30 layered in such a way in the length direction of the sheets while applying tension, wound electrode body 80 can be fabricated.

At a central portion in the winding axial direction of wound electrode body 80, a wound core part is formed (i.e. a region where positive electrode active material layer 14 in positive electrode sheet 10, negative electrode active material layer 24 in negative electrode sheet 20 and separator sheets 30 are tightly stacked). At the two edges of the winding axial direction of wound electrode body 80, electrode active material layer-free portions 10A and 20A in positive electrode sheet 10 and negative electrode sheet 20 stick out of the wound core part, respectively. At such positive electrode-side sticking-out portion (i.e. a portion free of positive electrode active material layer 14) and negative electrode-side sticking-out portion (i.e. a portion free of negative electrode active material layer 24), ends of positive current collector 76 and negative current collector 78 are attached, respectively. The other ends of these current collectors 76 and 78 are electrically connected to positive terminal 72 and negative terminal 74 described above, respectively.

Positive electrode sheet 10, negative electrode sheet 20 and separator sheets 30 that constitute wound electrode body 80 are discussed more in detail below.

<Positive Electrode Sheet>

The positive electrode sheet 10 according to the present embodiment has a positive electrode active material layer 14 comprising a positive electrode active material on each face of positive current collector 12. In addition to the positive electrode active material, positive electrode active material layer 14 may comprise, as necessary, optional components such as a conductive material, binder and so on.

As the positive electrode active material, a material capable of storing and releasing lithium is used. One, two or more species among materials conventionally used in lithium-ion secondary batteries (e.g. oxides having layered structures and oxides having spinel structures) can be used without particular limitations. Examples of such positive electrode active materials include oxides (lithium transition metal oxides) containing lithium and at least one species of transition metal as metal constituents, such as lithium nickel-based oxides, lithium cobalt-based oxides, lithium manganese-based oxides and the like. For example, lithium transition metal oxides having layered structures can be preferably used.

Herein, the meaning of the lithium nickel based oxide includes, besides oxides containing lithium (Li) and nickel (Ni) as metal constituents, an oxide that contains as metal constituents at least one species of metal in addition to lithium and nickel (i.e. a transition metal and/or a main group metal other than Li and Ni) in a stoichiometric proportion about equal to or smaller than that of nickel. The metal other than Li and Ni can be, for instance, one, two or more species selected from a group consisting of Co, Al, Mn, Cr, Fe, V, Ma, Ca, Ti, Zr, Nb, Mo, W, Cu, Zn, Ga, In, Sn, La and Ce. The same applies to the meanings of the lithium cobalt-based oxide and lithium manganese-based oxide.

The positive electrode active material may be a lithium transition metal oxide containing each of Ni, Co and Mn as metal constituents (lithium nickel cobalt manganese oxide, which may be represented by "LiNiCoMn oxide" hereinafter). A preferable example of such LiNiCoMn oxides is an oxide containing about equiatomic amounts of Ni, Co and Mn (e.g. $LiNi_{1/3}Co_{1/3}Mn_{1/3}O_2$).

Other preferable examples of a material usable as the positive electrode active material include olivine-type lithium phosphates as well as other polyanionic materials. For example, can be used an olivine-type lithium phosphate ($LiFePO_4$, $LiMnPO_4$, etc.) represented by a general formula $LiMPO_4$ (M is at least one species among Co, Ni, Mn and Fe).

Examples of the conductive material include carbon materials such as carbon powder, carbon fibers and the like, conductive metal powder such as nickel powder and the like. As the carbon powder, various types of carbon black (e.g. acetylene black, furnace black, Ketjen black) and graphite powder, etc., can be used. A particularly preferable carbon powder is acetylene black (AB). Among these conductive materials, solely one species, or two or more species in a suitable combination can be used.

As the binder, for example, can be used celluloses (e.g. carboxymethyl cellulose (CMC, typically used as a sodium salt)), polyvinyl alcohol (PVA), polytetrafluoroethylene (PTFE), styrene butadiene rubber (SBR), fluorine-based resins (e.g. polyvinylidene fluoride (PVDF)) vinyl acetate-based polymers, acrylic polymers (acrylic binders) and so on. Among these binders, solely one species, or two or more species in a suitable combination can be used. It is noted that in a positive electrode active material layer-forming dispersion described later, the binder may serve as a thickening agent or dispersion stabilizer in the dispersion.

The positive electrode active material content in the entire positive electrode active material layer is suitably about 50% by mass or greater (typically 50 to 95% by mass) or usually preferably about 70 to 95% by mass. When a conductive material is used, the conductive material content in the entire positive electrode active material layer can be, for instance, about 2 to 20% by mass or usually preferably about 2 to 15% by mass. When a binder is used, the binder content in the entire positive electrode active material layer can be about 1 to 10% by mass or usually suitably about 2 to 5% by mass.

As the positive current collector 12, a conductive material formed of a metal having good conductivity is preferably used. For example, aluminum or an alloy containing aluminum as the primary component can be used. The shape of positive current collector 12 is not particularly limited as it may vary depending on the shape, etc., of the lithium-ion secondary battery, and may have a variety of shapes such as a rod, plate, sheet, foil, mesh, and so on. In a lithium-ion secondary battery 100 comprising a wound electrode body 80 like the present embodiment, a sheet of positive current collector 12 made of aluminum (e.g. an aluminum sheet of about 10 μm to 30 μm thickness) can be preferably used.

Positive electrode sheet 10 having such a constitution can be preferably fabricated by applying to one or each face of positive current collector 12 (each face thereof in this embodiment) a paste or slurry composition (a dispersion for forming positive electrode active material layers) which contains a positive electrode active material (typically as a particulate) and optional components used as necessary dispersed in a suitable solvent (e.g. water, N-methyl-2-pyrrolidone (NMP), etc.) and drying the composition. The drying can be performed with heat as necessary. After dried, it may be pressed entirely as necessary. By performing such a pressing process (for which, various heretofore known methods can be employed such as a roll press method, flat plate press method, etc.), the thickness and density of positive electrode active material layer 14 can be adjusted.

The mass of positive electrode active material layer 14 provided per unit area of positive current collector 12 (the combined mass of both faces for a constitution having a positive electrode active material layer 14 on each face of positive current collector 12) is, for example, suitably about 8 $mg/cm^2$ to 30 $mg/cm^2$. The density of positive electrode active material layer 14 can be, for instance, about 1.9 $g/cm^3$ to 2.9 $g/cm^3$. Especially, in a lithium-ion secondary battery used as a power source to be loaded on a vehicle, it is preferable to satisfy at least one (preferably each) of the aforementioned positive electrode active material layer's mass ($mg/cm^2$) and positive electrode active material layer's density ($g/cm^3$).

<Negative Electrode Sheet>

The negative electrode sheet 20 according to the present embodiment has a negative electrode active material layer 24 comprising a negative electrode active material on each face of negative current collector 22. In addition to the negative electrode active material, negative electrode active material layer 24 may comprise, as necessary, optional components such as a conductive material, binders and so on.

As the negative electrode active material, one, two or more species among materials conventionally used in general lithium-ion secondary batteries can be used without particular limitations. Preferable examples of the negative electrode active material include carbon materials. A particulate carbon material (carbon particles) having a graphite structure (layered structure) at least partially is preferable. Any carbon material among so-called graphitic substances (graphites), hard-to-graphitize carbonaceous substances (hard carbons), easy-to-graphitize carbonaceous substances (soft carbons) and substances having a structure combining these can be preferably used. Among these, graphite particles such as natural graphite, etc., can be preferably used.

It may be carbon particles obtained by applying non-crystalline (amorphous) carbon to graphite surfaces, etc. The negative electrode active material content in the entire negative electrode active material layer is not particularly limited. It is usually suitably about 50% by mass or greater, or preferably about 90 to 99% by mass (e.g. about 95 to 99% by mass).

As the negative electrode active material, various metal compounds can be used as well. Specific examples of such metal compounds include metal compounds (preferably metal oxides) comprising Si, Ge, Sn, Pb, Al, Ga, In, As, Sb, Bi, etc., as metal constituents.

For the binder and conductive material, materials similar to those listed for the positive electrode can be used singly or in combination of two or more species, respectively.

The negative electrode active material content in the entire negative electrode active material layer is suitably about 50% by mass or greater (typically 50 to 99.5% by mass) or usually preferably about 70 to 99% by mass (e.g. 75 to 98% by mass). When a binder is used, the binder content in the entire negative electrode active material layer can be about 1 to 10% by mass or usually suitably about 2 to 5% by mass. When a conductive material is used, the amount used can be suitably selected according to the type and amount, etc., of negative electrode active material. In usual, the conductive material content in the entire negative electrode active material layer is suitably about 40% by mass or less and can be, for instance, about 20% by mass or less (typically 2 to 20% by mass).

As negative current collector 22, a conductive material formed of a metal having good conductivity is preferably used. For example, copper or an alloy containing copper as the primary component can be used. Negative current collector 22 may have various shapes, similarly to positive current collector 12. In a lithium-ion secondary battery 100 comprising a wound electrode body 80 like the present embodiment, a sheet of negative current collector 22 made of copper (e.g. a copper sheet of about 5 µm to 30 µm thickness) can be preferably used.

Negative electrode active material layer 24 can be preferably fabricated by applying to negative current collector 22 a paste or slurry composition (a dispersion for forming negative electrode active material layers) which contains a negative electrode active material (typically as a particulate) dispersed in a suitable solvent (e.g. water, NMP, etc.) and drying the composition. The drying can be performed with heat as necessary. After dried, it may be pressed entirely as necessary. By performing such a pressing process, the thickness and density of negative electrode active material layer 24 can be adjusted.

The mass of negative electrode active material layer 24 provided per unit area of negative current collector 22 (the combined mass of both faces) is, for example, suitably about 6 mg/cm$^2$ to 30 mg/cm$^2$. The density of negative electrode active material layer 24 can be, for instance, about 0.9 g/cm$^3$ to 1.5 g/cm$^3$. Especially, in a lithium-ion secondary battery used as a power source to be loaded on a vehicle, it is preferable to satisfy at least one (preferably each) of the aforementioned negative electrode active material layer's mass (mg/cm$^2$) and negative electrode active material layer's density (g/cm$^3$).

<Organic Porous Material Layer>

In the present embodiment, the heat-resistant separator 30 placed between positive electrode sheet 10 and negative electrode sheet 20 comprises an organic porous material layer 32 formed from a porous resin sheet and an inorganic porous material layer 34 formed on the first surface 32A thereof.

As the porous resin sheet, resin sheets similar to those used as separators in conventional lithium-ion secondary batteries can be used. For example, a porous sheet primarily constituted with thermoplastic resin such as a polyolefine (polyethylene (PE), polypropylene (PP), etc.), polyester, polyamide or the like can be preferably used as the organic porous material layer 32 in the present invention. A preferable example is a porous sheet (polyolefine-based porous sheet) having a single-layer or multi-layer structure primarily constituted with one, two or more species of polyolefine resin. For example, a PE sheet, a PP sheet, a three-layer (PP/PE/PP) sheet in which a PP layer is laminated to each side of a PE layer, etc., can be preferably used. The PE may be any type of polyethylene generally called a high density polyethylene (HDPE), low density polyethylene (LDPE) or linear low density polyethylene (LLDPE), or may be a mixture of these. The porous resin sheet (organic porous material layer) may comprise, as necessary, additives such as various plasticizers, antioxidants and so on.

As organic porous material layer 32 in the present embodiment, a uni-axially stretched or bi-axially stretched porous resin sheet can be preferably used. In particular, a porous resin sheet uni-axially stretched in the machine direction (MD direction) is preferable since it has suitable strength while being less susceptible to thermal contraction in the width direction (in a direction (TD direction) perpendicular to the MD direction).

As the organic porous material layer 32 in the art disclosed herein, a porous sheet made of a thermoplastic resin (e.g. a polyolefine resin) having a shutdown temperature of about 120° C. to 140° C. (typically 125° C., to 135° C.) can be preferably used. The shutdown temperature is sufficiently lower than the heatproof temperature (typically about 200° C. or higher) of a battery; and therefore the shutdown function can be activated in a timely manner. Even when organic porous material layer 32 undergo thermal contraction or through-hole formation at the shutdown temperature or a higher temperature, insulation between the positive and negative electrodes can be properly maintained with inorganic porous material layer 34 placed between organic porous material layer 32 and negative electrode active material layer 24 (i.e. between positive electrode active material layer 14 and negative electrode active material layer 24).

The thickness of organic porous material layer 32 can be, for instance, about 10 µm to 30 µm or usually preferably about 15 µm to 25 µm. When the thickness of organic porous material layer 32 is excessively large, the ion conductivity of organic porous material layer 32 may decrease or the energy density of the battery may decrease. On the other hand, when the thickness of organic porous material layer 32 is excessively small, the strength may become insufficient or the shutdown temperature may become difficult to control. The thickness of organic porous material layer 32 can be determined by analyzing images taken with a scanning electron microscope (SEM).

Organic porous material layer 32 generally has a porosity of preferably about 20 to 60% by volume, or, for example, more preferably about 30 to 50% by volume. An excessively high porosity of organic porous material layer 32 may result in insufficient strength or significant thermal contraction. On the other hand, when the porosity of organic porous material layer 32 is excessively low, the amount of an electrolyte solution retainable in organic porous material layer 32 will be smaller and the ion conductivity will decrease, likely leading to poorer high-rate charge/discharge properties. The porosity of organic porous material layer 32 can be determined from the apparent density of the porous material layer and the true density of the organic porous material layer-forming material.

When the average pore diameter of organic porous material layer 32 is too small, the ion conductivity may decrease, likely leading to poorer high-rate charge/discharge properties. If the average pore diameter is too large, when the inorganic porous material layer is formed by applying an inorganic porous material layer-forming dispersion described later to organic porous material layer 32, the inorganic filler or Li absorber will be excessively trapped in pores of organic porous material layer 32, likely leading to poorer ion conductivity or poorer high-rate charge/discharge properties. The average pore diameter of organic porous material layer 32 is related to the air permeability. Prescription of the air permeability allows for pseudo prescription of the average pore diameter. The term "air permeability" herein refers to air resistance (Gurley) and can be measured by a method specified in JIS P8117. As the organic porous material layer 32, can be preferably used one having an air permeability (Gurley value) of about 100 sec/100 mL to 1000 sec/100 mL (e.g. 200 sec/100 mL to 600 sec/100 mL).

<Inorganic Porous Material Layer>

The inorganic porous material layer 34 comprises at least an inorganic filler and a Li absorber, and typically further comprises a binder to bind the inorganic filler (typically, the inorganic filler and the Li absorber). As the binder, materials similar to those listed for the positive electrode can be used. In addition to the effect obtained with the Li absorber contained in the porous material layer, similarly to a conventional inorganic porous material layer free of a Li absorber, the inorganic porous material layer 34 may produce an effect to increase the capability to maintain insulation between the positive and negative electrodes at the shutdown temperature of organic porous material layer 32 or in a higher temperature range. According to an embodiment where inorganic porous material layer 34 is provided on organic porous material layer 32 as in the present embodiment, inorganic porous material layer 34 may produce an effect to suppress thermal contraction (i.e. to increase the shape-stability) of organic porous material layer 32.

[Inorganic Filler]

The inorganic filler is an inorganic material that stores essentially no Li at a potential higher than at least the Li-storing potential of the negative electrode active material contained in the inorganic electrode active material layer 24. A preferable inorganic material is electrically inactive (in other words, is highly electrochemically stable) over the entire operational range of a lithium-ion secondary battery comprising the inorganic filler. An inorganic material that provides excellent electric insulation and heat resistance can be preferably used. Examples of an inorganic compound constituting such an inorganic filler include oxides, hydroxides and nitrides of metals, etc. Preferable examples include alumina, magnesia, titania, zirconia, silica, boehmite (alumina monohydrate represented by a compositional formula $Al_2O_3 \cdot H_2O$), boron nitride (BN), aluminum nitride (AlN), etc. In particular, one, two or more species of inorganic filler selected from alumina, magnesia and titania can be preferably used. Inorganic fillers of such material have high electrochemical stability as well as excellent heat resistance and mechanical strength. The art disclosed herein can be preferably practiced, for instance, in an embodiment where the inorganic filler essentially consists of one, two or more species of alumina, magnesia and titania, in an embodiment where the inorganic filler essentially consists of alumina, in an embodiment where the filler essentially consists of magnesia, or in an embodiment where the filler essentially consists of titania, etc.

The inorganic filler is typically in a powder form. The shape of particles constituting the powder can have shapes of for instance, granules, fibers, flakes, etc. Usually, a preferable inorganic filler is formed of granular particles. For instance, a powder-form inorganic filler consisting of an inorganic oxide or an inorganic hydroxide can be preferably used. Particles constituting such an inorganic filler powder may have an average particle diameter of, for instance, about 0.05 µm to 2 µm (typically 0.1 µm to 2 µm, preferably 0.4 µm to 0.7 µm). When the average particle diameter is too small, the average pore diameter of the inorganic porous material layer may become smaller, likely leading to poorer ion conductivity or poorer high-rate charge/discharge properties. When the average particle diameter of the inorganic filler is too large, it may become difficult to form a thin and even inorganic porous material layer. Unless otherwise specified, the "average particle diameter" in the present description refers to a particle diameter at 50% cumulative volume in a size distribution measured using a particle size distribution measuring device based on a laser scattering/diffraction method (50% volume average particle diameter, which may be abbreviated to "$D_{50}$" hereinafter).

[Li Absorber]

As the Li absorber, a material that irreversibly stores Li at a potential higher than the Li-storing potential of the negative electrode active material is used. In other words, the Li absorber is a material capable of reacting with part of Li (which could be Li released from the positive electrode active material) in the electrolyte (typically, irreversibly storing the Li) during charging of the battery (e.g. during initial charging) with precedence over storing of the Li in the negative electrode active material (e.g. inserting the Li to interlayer spaces in graphite). As such a Li absorber, for instance, can be preferably used nickel oxide (NiO), carbon fluoride (CnF), manganese dioxide ($MnO_2$) or the like. Among these Li absorbers, a single species can be used solely, or two or more species can be used in a certain combination. The art disclosed herein can be preferably practiced, for instance, in an embodiment where the Li absorber essentially consists of one, two or more species of NiO, CnF and $MnO_2$, in an embodiment where the absorber essentially consists of NiO, in an embodiment where the absorber essentially consists of CnF, or in an embodiment where the absorber essentially consists of $MnO_2$, etc.

There are not particular limitations to the state of the Li absorber used in preparation of an inorganic porous material layer (typically, the state is about the same as that of the Li absorber contained in the inorganic porous material layer at the time of the battery construction). For example, it may be in a loose powder form or may be in a state such that it is stuck (e.g. stuck in thin film, clumps, etc.) on surfaces of the organic porous material layer and/or surfaces of the inorganic filler. When a Li absorber in a loose powder form is used, the shape of a particle is not particularly limited and the particles may have shapes of, for instance, granules, fibers, flakes, etc. From the standpoint of the production ease of an inorganic porous material layer (and further of a lithium secondary battery having the inorganic porous material layer), in usual, a Li absorber in a loose powder form (typically in granules) can be preferably used. The powder (Li absorber powder) may have an average particle diameter of, for example, about 0.05 µm to 2 µm (typically 0.1 µm to 2 μm, preferably 0.4 μm to 0.7 μm). When the average particle diameter is too small, the handling properties of the Li absorber power may decrease. When the average particle diameter is too large, it may be difficult to form a thin and even inorganic porous material layer. Due to a reaction between Li absorber particles and Li, local deformation may also occur in the inorganic porous material layer, possibly reducing the tightness of binding between the inorganic porous material layer and the organic porous material layer. It is usually suitable to use a Li absorber powder having an average particle diameter at a scale of 0.3 times to 6 times (e.g. 0.5 times to 5 times) the average particle diameter of the inorganic filler used. For example, a Li absorber powder having an average particle diameter about equal to (typically about 0.75 times to 1.2 times) the average particle diameter of the inorganic filler can be preferably used.

The Li absorber content in the inorganic porous material layer can be, for instance, relative to 100 parts by mass of the inorganic filler, 200 parts by mass or lower (typically 2 to 200 parts by mass), usually suitably 5 to 150 parts by mass, or preferably 10 to 100 parts by mass. When the Li absorber is in a large excess relative to the inorganic filler, due to a reaction between the Li absorber and Li, the crystal structure, volume, strength and so on of the Li absorber may change, possibly resulting in a decrease in the strength or the shape-stability of the inorganic porous material layer or reduced tightness of binding between the inorganic porous material layer and the organic porous material layer. When the Li absorber is in too small an amount relative to the inorganic filler, the amount of the inorganic porous material layer required for placement of a desirable amount of the Li absorber may increase, likely leading to an increase in the internal resistance of the battery or a decreased energy density.

It is preferable that the amount of the Li absorber used for constituting the lithium secondary battery disclosed herein (typically a lithium-ion secondary battery) is approximately equal to an amount corresponding to the difference between an irreversible capacity loss occurring during initial charging and discharging (i.e. a difference between an initial charging capacity and an initial discharging capacity) at the positive electrode and an irreversible capacity loss occurring during initial charging and discharging at the negative electrode. When the amount of the Li absorber is too large, the amount of Li irreversibly stored in the Li absorber may increase, likely resulting in a decrease in the initial battery capacity. Too small an amount of the Li absorber tends to result in a diminished effect to increase the durability to high-rate charge/discharge cycles. In a battery according to a preferable embodiment, the Li absorber amount relative to 100 parts by mass of the positive electrode active material is 1 to 15 parts by mass (e.g. 1.5 to 11 parts by mass) or more preferably 2 to 10 parts by mass (e.g. 1 to 5 parts by mass). Such a Li absorber amount can be preferably applied, for instance, to an embodiment where a layered lithium transition metal oxide (lithium nickel-based oxide, LiNiCoMn oxide, etc.) is used as the positive electrode active material and a Li absorber consisting of one, two or more species among NiO, CnF and $MnO_2$ is used as the Li absorber.

While not limited to the following, the combined mass ratio of the inorganic filler and the Li absorber to the entire inorganic porous material layer 34 is preferably about 90% by mass or higher (typically 95% by mass to 99% by mass) or more preferably about 97% by mass to 99% by mass. The ratio of the polymer ingredient (which is typically a binder, including one that serves as a thickening agent) to the entire inorganic porous material layer 34 can be, for instance, about 10% by mass or lower (e.g. 0.2 to 10% by mass), usually suitably about 5% by mass or lower (e.g. 0.3 to 3% by mass), or preferably 0.3 to 3% by mass. When the ratio of the polymer ingredient is too low, the tightness of binding between inorganic porous material layer 34 and organic porous material layer 32 or the strength (shape-stability) of inorganic porous material layer 34 itself may decrease, likely leading to occurrence of defects such as cracking and peeling, etc. When the ratio of the polymer ingredient is too high, the porosity of inorganic porous material layer 34 may become insufficient, possibly resulting in a decrease in the ion permeability of inorganic porous material layer 34 (and even an increase in the resistance of a secondary battery comprising the inorganic porous material layer 34).

The mass (coating weight) of inorganic porous material layer 34 provided per unit area of organic porous material layer 32 is generally preferably about 0.3 $g/cm^2$ to 2 $g/cm^2$ or more preferably about 0.5 $g/cm^2$ to 1.5 $g/cm^2$. When the coating weight of inorganic porous material layer 34 is too small, the strength of inorganic porous material layer 34 may tend to decrease. When the coating weight of inorganic porous material layer 34 is too large, the internal resistance of the battery may increase or the energy density may tend to decrease.

The combined thickness of organic porous material layer 32 and inorganic porous material layer 34 (i.e. the thickness of heat-resistant separator 30) is generally suitably 15 μm or larger (e.g. 15 μm to 40 μm), preferably 20 μm or larger (e.g. 20 μm to 40 μm), or particularly preferably 24 μm or larger (e.g. 24 μm to 40 μm).

The porosity of inorganic porous material layer 34 can be, for instance, generally about 30 to 70% by volume and usually suitably 40 to 60% by volume. When the porosity of inorganic porous material layer 34 is too high, the strength of inorganic porous material layer 34 is likely to decrease. When the porosity of inorganic porous material layer 34 is too low, the amount of an electrolyte solution retainable in inorganic porous material layer 34 will be smaller and the ion conductivity will decrease, likely leading to poorer high-rate charge/discharge properties. The porosity of inorganic porous material layer 34 can be determined from the apparent density of the porous material layer and the true density of the inorganic porous material layer-forming material.

The separator sheet (heat-resistant separator) 30 according to the present embodiment can be preferably fabricated by applying to organic porous material layer 32 a suitable amount of a paste or slurry composition (a dispersion for forming inorganic porous material layers) which contains inorganic porous material layer-forming ingredients dispersed in a suitable solvent, followed by drying the composition. As the solvent (dispersion medium), water or a solvent mixture primarily comprising water can be preferably used. As the solvent that constitutes the solvent mixture other than water, one, two or more species can be suitably selected and used among organic solvents (lower alcohols, lower ketones, etc.) that are miscible with water. Alternatively, as the dispersion medium, certain organic solvents (e.g. NMP, pyrrolidone, methyl ethyl ketone, methyl isobutyl ketone, cyclohexanone, toluene, dimethylformamide, dimethylacetamide, etc.) can be used singly or in a suitable combination. The non-volatile content (NV) of the inorganic porous material layer-forming dispersion is not particularly limited while it can be usually 20 to 70% by mass (e.g. 30 to 60% by mass) or preferably about 40 to 60% by mass.

<Non-Aqueous Electrolyte>

As the non-aqueous electrolyte in the lithium secondary battery disclosed herein, can be used a non-aqueous electrolyte (typically a non-aqueous electrolyte solution) comprising a non-aqueous solvent and a lithium compound (supporting electrolyte) soluble in the non-aqueous solvent to supply lithium ions.

As the non-aqueous solvent, can be used solvents similar to those used in electrolyte solutions for use in heretofore general lithium-ion secondary batteries. Such a non-aqueous electrolyte solution typically comprises a non-aqueous solvent and a lithium compound (supporting electrolyte) soluble in the solvent to supply lithium ions. As the non-aqueous solvent, can be used aprotic solvents such as carbonates, esters, ethers, nitriles, sulfones, lactones, etc. For example, can be used one, two or more species selected from non-aqueous solvents generally known to be usable for electrolyte solutions in lithium-ion secondary batteries, such as ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc. Preferable examples of non-aqueous solvents for the electrolyte solution in the art disclosed herein include a non-aqueous solvent primarily comprising a carbonate. For example, can be preferably used a non-aqueous electrolyte solution comprising one, two or more species of carbonates as the non-aqueous solvent, with the combined volume of these carbonates accounting for 60% by volume or higher (more preferably 75% by volume or higher, even more preferably 90% by volume or higher, or even essentially 100% by volume) of the total volume of the non-aqueous solvent.

As the supporting electrolyte, can be suitably used various materials known to serve as supporting salts in lithium-ion secondary batteries. For example, can be used one, two or more species selected from various lithium salts known to be able to serve as supporting electrolytes in lithium-ion secondary batteries, such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ and the like. In particular, $LiPF_6$ can be preferably used.

The concentration of the supporting electrolyte (supporting salt) is not particularly limited, and can be, for instance, about the same as in a conventional lithium-ion secondary battery. Usually, a non-aqueous electrolyte solution containing a supporting electrolyte at a concentration of about 0.1 mol/L to 5 mol/L (e.g. about 0.8 mol/L to 3.5 mol/L) can be preferably used.

As long as the effects by the present invention are not greatly impaired, the non-aqueous electrolyte solution in the art disclosed herein may include components in addition to the supporting electrolyte and the non-aqueous solvent. Examples of such optional components include additives such as fluorophosphates (e.g. lithium difluorophosphate, lithium monofluorophosphate) bis(oxalate)borates (e.g. lithium bis(oxalate)borate) and so on. Alternatively, the non-aqueous electrolyte solution may be essentially free of components other than a supporting electrolyte and a non-aqueous solvent.

<Lithium-Ion Secondary Battery>

The lithium-ion secondary battery 100 according to the present embodiment can be constructed (assembled) by inserting wound electrode body 80 having the aforementioned constitution into main casing 52 via its opening and fastening lid 54 onto the opening by welding, etc., followed by injecting a non-electrolyte solution via an injection hole not shown in the drawing and sealing the injection hole by welding, etc. The processes for sealing battery case 50 and placing (injecting) the electrolyte solution can be carried out in the same manner as heretofore known production methods for lithium-ion secondary batteries and do not characterize the present invention.

In general, a lithium secondary battery (e.g. lithium-ion secondary battery) becomes commercially available after an initial charging step (a so-called conditioning step) following the assembly of battery components. By the conditioning step, the subsequent performance of the lithium secondary battery may stabilize. Such a conditioning step may involve charging and discharging of the battery at relatively low rates (e.g. 2 to 3 cycles of charging at a constant current rate of about 1/10 C to 2 C to a prescribed charge termination voltage followed by discharging at a constant current rate of about 1/10 C to 2 C to a prescribed discharge termination voltage). In the conditioning step (particularly during the first charging), some of Li from the positive electrode active material or non-aqueous electrolyte solution is irreversibly stored in the Li absorber. This allows for production of a lithium secondary battery having excellent durability to high-rate charge/discharge cycles. It is considered that such an effect is obtained because part of Li is fixed with the Li absorber so that Li in the negative electrode active material can be suitably released even during a high-rate discharge, thereby possibly suppressing performance degradation of the negative electrode active material (e.g. a decrease in the capacity to accept Li during charging). It is noted that irreversible storing of Li in the Li absorber takes place especially during the first charging. Thus, the conditioning step may comprise just at least the first charging step. For example, the conditioning step may include, for instance, only a first charging step, but not a discharging step.

In the art disclosed herein, NiO as the Li absorber may produce Ni and $Li_2O$ by storing Li. CnF may produce LiF and C by storing Li. $MnO_2$ may produce $LiMnO_2$ by storing Li. Lithium secondary batteries produced using these compounds as the Li absorber may have constitutions in which part or all (typically, essentially all) of the Li absorber has been converted to the products of these reactions with Li (typically including Li compounds) after the first charging.

The effects by the Li absorber described above may be produced in an embodiment such as the present embodiment where the Li absorber is contained in the inorganic porous material layer 34 of each of the two heat-resistant separator sheets 30 and also, for instance, in an embodiment where the Li absorber is contained only in the inorganic porous material layer 34 of one of the two heat-resistant separator sheets 30. From the standpoint of allowing uniform progresses of the battery reactions, it is usually preferable that the Li absorber is contained in the inorganic porous material layer 34 of each of the two heat-resistant separator sheets 30 (typically, two sheets of the same heat-resistant separator are used).

Figure 3:
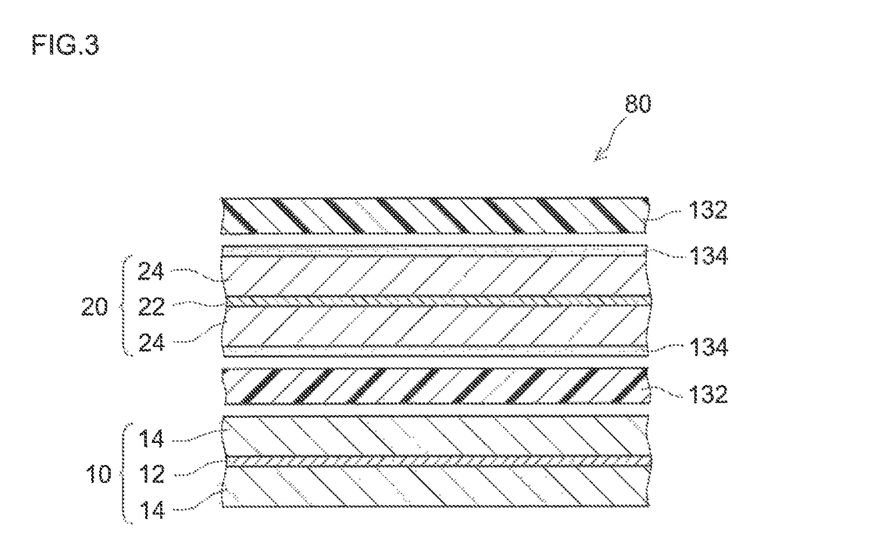
FIG. 3 shows a schematic cross-sectional view illustrating a main part of a lithium-ion secondary battery according to another embodiment.

Although the present embodiment uses a heat-resistant separator 30 in which inorganic porous material layer 34 is formed on the first surface (negative electrode-facing surface) 32A of organic porous material layer 32, the placement of the inorganic porous material layer in the lithium secondary battery according to the present invention is not limited to this. For example, as shown in FIG. 3, wound electrode body 80 can be constituted by forming an inorganic porous material layer 134 on negative electrode active material layer 24 of negative electrode sheet 20 and combining the resulting inorganic porous material layer-bearing negative electrode sheet with separator sheets (e.g. porous resin sheets such as porous polyolefine sheets, etc.) 132 as organic porous material layers. The inorganic porous material layer 134 can be formed, for instance, by applying to negative electrode active material layer 24 the inorganic porous material layer-forming dispersion described above followed by drying. A lithium secondary battery having such a constitution may attain an effect to increase the durability to high-rate charge/discharge by means of the Li absorber contained in the inorganic porous material layer 134. Inorganic porous material layer 134 may lead to an effect to increase the capability to maintain insulation between the positive and negative electrodes at the shutdown temperature of separator sheet (organic porous material layer) 132 or in a higher temperature range.

An embodiment (e.g. FIG. 2) where an inorganic porous material layer is provided on one face of a porous resin sheet as the organic porous material layer is preferable to an embodiment (e.g. FIG. 3) where an inorganic porous material layer is provided on a negative electrode active material layer, in view such that it is not likely to allow excesses of inorganic porous material layer ingredients to enter the negative electrode active material layer to reduce diffusion of the electrolyte in the negative electrode active material layer, or the inorganic porous material layer is highly retainable since the organic porous material layer experiences smaller volume changes associated with charging and discharging as compared to the negative electrode active material layer.

The lithium secondary battery according to the present invention can achieve excellent durability to high-rate charge/discharge. In general, because highly reliable insulation is required of a battery used in an embodiment where it can be charged or discharged at high rates (e.g. a lithium-ion secondary battery used as a driving power source in a vehicle), it is particularly meaningful to provide it with a highly heat-resistant inorganic porous material layer in addition to an organic porous material layer (e.g. a porous resin sheet having a shutdown function). In the lithium secondary battery disclosed herein, the Li absorber is placed as an ingredient of such an inorganic porous material layer; and therefore, while benefiting from the features of a conventional inorganic porous material layer (free of a Li absorber), an effect to increase the durability to high-rate charge/discharge can be further obtained. Since the Li absorber can be placed by means of an inorganic porous material layer, it is advantageous also in terms of the productivity and cost-effectiveness of the lithium secondary battery.

When the Li absorber is included, for instance, in the negative electrode active material layer instead of the inorganic porous material layer, defects may occur, such as increased resistance since the Li absorber is poorly conductive (typically non-conductive) as opposed to the negative electrode active material, decreased shape-stability of the negative electrode active material layer caused by a reaction between the Li absorber and Li, increased resistance due to increased occurrence of vacant spaces in the negative electrode active material layer caused by the reaction, etc. When the Li absorber is added as an ingredient of the organic porous material layer, defects may occur, such as a lower allowable voltage of the organic porous material layer due to vacant spaces formed by a reaction between the Li absorber and Li, less control of the shutdown function of the organic porous material layer, etc. With the inclusion of the Li absorber in the inorganic porous material layer, it is possible to avoid occurrence of these defects while increasing the durability to high-rate charge/discharge.

Some worked examples relating to the present invention are described below while the present invention is not to be limited to embodiments illustrated in such specific examples. In the following description, the terms "part(s)" and "%" are based on the mass unless otherwise specified.

Example 1

(Fabrication of Heat-Resistant Separator)

Alumina powder (0.6 µm average particle diameter; available from Sumitomo Chemical Co., Ltd.; "AKP3000") as an inorganic filler, an acrylic binder (a Zeon Corporation product) and CMC (available from Dai-ichi Kogyo Seiyaku Co., Ltd.; trade name "BSH6") were mixed with ion-exchanged water as a solvent at a $Al_2O_3$:binder:CMC ratio of 98:1.3:0.7, to a 50% non-volatile content (NV). For the mixing, a disper-mill (available from ROBO MICS) was used. The mixing was performed at 5000 rpm for 15 minutes. A slurry (dispersion) for forming inorganic porous material layers was thus prepared.

To a face (first face) of a single-layer polyethylene porous sheet (available from Ube Industries, Ltd., 20 µm thick, 45 vol % porosity, 400 sec/100 mL air permeability; "porous PE sheet" hereinafter), the slurry prepared above was applied with a gravure coater and allowed to dry at 70° C. to form an inorganic porous material layer. The applied amount (coating weight) of the slurry was adjusted to 0.7 mg/cm$^2$ based on the solid content. After dried, the inorganic porous material layer had a thickness of 4 µm. A heat-resistant separator retaining an inorganic porous material layer (free of a Li absorber) on the first face of a porous PE sheet was thus obtained.

(Positive Electrode Sheet)

As a positive electrode active material, powder of a lithium oxide represented by a compositional formula $LiNi_{1/3}Co_{1/3}Mn_{1/3}O_2$ was used. The positive electrode active material, acetylene black (AB) as a conductive material and PVdF as a binder were mixed in NMP at a positive electrode active material:AB:PVdF ratio of 85:10:5 to a 56% NV to prepare a slurry for forming positive electrode active material layers. The slurry was applied to each face of a long piece of 15 µm thick aluminum foil (current collector), allowed to dry and then pressed to an overall thickness (thickness of current collector and positive electrode active material layers on both faces combined) of 88 µm. After pressed, the positive electrode active material layers had a density of 2.1 g/cm$^3$. This was cut to a long strip having a 71 mm wide coating band (referring to the portion where the active material layer was formed; the same applies hereinafter) and a 16 mm wide coating-free area (referring to an active material layer-free portion; the same applies hereinafter) provided along a long side of the coating hand. A positive electrode was thus fabricated.

(Negative Electrode Sheet)

Powder of a carbonaceous substance (negative electrode active material) consisting of graphite particles having surfaces coated with amorphous carbon, SBR as a binder and an aqueous CMC solution (CMC concentration 0.7%) as a thickening agent were mixed with ion-exchanged water at a negative electrode active material:SBR:CMC ratio (based on solid content) of 98:1:1 to a 39% NV to prepare a slurry for forming negative electrode active material layers. The slurry was applied to each face of a long piece of 10 µm thick copper foil (negative current collector), allowed to dry and then pressed to an overall thickness of 85 μm. After pressed, the negative electrode active material layers had a density of 1.4 g/cm$^3$. This was cut to a long strip having a 76 mm wide coating band and a 14 mm wide coating-free area provided along a long side of the coating band. A negative electrode was thus fabricated.

(Non-Aqueous Electrolyte Solution)

As a non-aqueous solvent, was used a carbonate-based solvent mixture containing ethylene carbonate (EC), ethyl methyl carbonate (EMC) and dimethyl carbonate (DMC) at a volume ratio of 3:3:4. In the solvent, LiPF$_6$ as a lithium salt (supporting salt) was dissolved to a 1.1 mol/L concentration to prepare a non-aqueous electrolyte solution.

(Construction of Battery)

The positive electrode sheet, the negative electrode sheet and two sheets of heat-resistant separator were overlaid and wound so that the inorganic porous material layers of the separators faced the negative electrode sheet (negative electrode active material layers). The resulting wound body was laterally compressed to a flat shape. Onto the coating-free areas of the respective electrode sheets, positive and negative current collector terminals were welded, respectively. The electrode body-terminals assembly was inserted in a laminated film case and 45 g of the non-aqueous electrolyte solution was injected therein. The opening was then sealed to construct a laminated cell according to the present example.

Example 2

NiO powder (400 mesh nickel oxide available from Alfa Aesar pulverized in a planet ball mill to about 0.5 μm average particle diameter) as a Li absorber was included in the inorganic porous material layer of the heat-resistant separator in Example 1. More specifically, at a Al$_2$O$_3$:NiO: binder:CMC ratio of 98:85:1.3:0.7, they were mixed with ion-exchanged water to a 50% NV to prepare a slurry for forming inorganic porous material layers. The slurry was applied to a first face of the porous PE sheet to an applied amount of 1.39 times the mass applied in Example 1 and allowed to dry. Otherwise, in the same manner as Example 1, a heat-resistant separator was fabricated. Using the heat-resistant separator, a laminated cell was constructed. The heat-resistant separator used for fabricating the cell according to the present example contained, in the inorganic porous material layer facing the negative electrode, NiO in an amount equivalent to 10% by mass of the positive electrode active material used to fabricate the cell (i.e. 0.19 g per 1 g of positive electrode active material).

Example 3

An inorganic porous material layer-firming slurry was prepared at a Al$_2$O$_3$:NiO:binder:CMC ratio of 98:102:1.3: 0.7 and the amount of the slurry applied based on the solid content was 2.02 times the mass applied in Example 1. Otherwise, in the same manner as Example 1, a laminated cell was constructed. The heat-resistant separator used for fabricating the cell according to the present example contained NiO in an amount equivalent to 12% by mass of the positive electrode active material in the inorganic porous material layer facing the negative electrode.

Example 4

An inorganic porous material layer-forming slurry was prepared at a Al$_2$O$_3$:NiO:binder:CMC ratio of 98:17:1.3:0.7 and the amount of the slurry applied based on the solid content was 1.17 times the mass applied in Example 1. Otherwise, in the same manner as Example 1, a laminated cell was constructed. The heat-resistant separator used for fabricating the cell according to the present example contained NiO in an amount equivalent to 2% by mass of the positive electrode active material in the inorganic porous material layer facing the negative electrode.

Example 5

An inorganic porous material layer-forming slurry was prepared at a Al$_2$O$_3$:NiO:binder:CMC ratio of 98:9:1.3:0.7 and the amount of the slurry applied based on the solid content was 1.09 times the mass applied in Example 1. Otherwise, in the same manner as Example 1, a laminated cell was constructed. The heat-resistant separator used in the present example contained NiO in an amount equivalent to 1% by mass of the positive electrode active material in the inorganic porous material layer facing the negative electrode.

Example 6

CnF powder (trade name "CEFBON" available from Central Glass Co., Ltd., pulverized in a ball mill to about 0.5 μm average particle diameter) was used in place of the NiO powder in Example 4. That is, an inorganic porous material layer-forming slurry was prepared at a Al$_2$O$_3$:CnF:binder: CMC ratio of 98:17:1.3:0.7 and the amount of the slurry applied based on the solid content was 1.17 times the mass applied in Example 1. Otherwise, in the same manner as Example 1, a laminated cell was constructed. The heat-resistant separator used for fabricating the cell according to the present example contained CnF in an amount equivalent to 2% by mass of the positive electrode active material in the inorganic porous material layer facing the negative electrode.

Example 7

MnO$_2$ powder (325 mesh manganese oxide available from Alfa Aesar, pulverized in a planet ball mill to about 0.5 μm average particle diameter) was used in place of the NiO powder in Example 4. That is, an inorganic porous material layer-forming slurry was prepared at a Al$_2$O$_3$:MnO$_2$:binder: CMC ratio of 98:17:1.3:0.7 and the amount of the slurry applied based on the solid content was 1.17 times the mass applied in Example 1. Otherwise, in the same manner as Example 1, a laminated cell was constructed. The heat-resistant separator used for fabricating the cell according to the present example contained MnO$_2$ in an amount equivalent to 2% by mass of the positive electrode active material in the inorganic porous material layer facing the negative electrode.

Example 8

In this example, MgO powder (100 nm average particle diameter, magnesium oxide available from Alfa Aesar) was used as the inorganic filler. More specifically, an inorganic porous material layer-forming slurry was prepared at a MgO:NiO:binder:CMC ratio of 245:85:13:0.7 and the amount of the slurry applied based on the solid content was 23 times the mass applied in Example 1. Otherwise, in the same manner as Example 1, a laminated cell was constructed. The heat-resistant separator used for fabricating the cell according to the present example contained NiO in an amount equivalent to 10% by mass of the positive electrode active material in the inorganic porous material layer facing the negative electrode.

Example 9

In this example, TiO$_2$ powder (1 µm average particle diameter, titanium oxide available from Alfa Aesar) was used as the inorganic filler. More specifically, an inorganic porous material layer-forming slurry was prepared at a TiO$_2$:NiO:binder:CMC ratio of 122:85:1.3:03 and the amount of the slurry applied based on the solid content was 2.1 times the mass applied in Example 1. Otherwise, in the same manner as Example 1, a laminated cell was constructed. The heat-resistant separator used for fabricating the cell according to the present example contained NiO in an amount equivalent to 10% by mass of the positive electrode active material in the inorganic porous material layer facing the negative electrode.

Example 10

In this example, no inorganic filler was used for forming the inorganic porous material layer. More specifically, an inorganic porous material layer-forming slurry was prepared at a NiO:binder:CMC ratio of 98:1.3:0.7. Otherwise, in the same manner as Example 1, a laminated cell was constructed.

Example 11

In this example, the same heat-resistant separator as Example 1 was used, but the heat-resistant separator sheets, negative electrode sheet and positive electrode sheet were overlaid so that the inorganic porous material layer of each heat-resistant separator sheet faced the positive electrode sheet (positive electrode active material layers). Otherwise, in the same manner as Example 1, a laminated cell was constructed. The heat-resistant separator used for fabricating the cell according to the present example contained NiO in an amount equivalent to 10% by mass of the positive electrode active material in the inorganic porous material layer facing the positive electrode.

<Performance Evaluations>

The following performance evaluations were carried out in a normal temperature room at 25° C.

[Initial Capacity]

The cell according to each example was charged at a constant current (CC) equivalent to 1 C to a voltage across the terminals of 4.1 V, and then discharged at a constant current of 1 C to 3 V and measured for its capacity at the same time. It is noted that "1 C" refers to the capacity (herein, a value computed from the theoretical capacity and used amount of the positive electrode active material) of the cell subjected to the measurement.

[Initial Resistance]

The cell after the initial capacity measurement was charged at a constant current of 1 C to a voltage across the terminals of 3.537 V and continuously charged at the same constant voltage (CV) to a current reading of 0.05 C. Subsequently it was discharged at a current value of 20 A (equivalent to 4 C) for 10 seconds, and the voltage was measured from the start of discharge to 10 seconds. From the voltage change during this time, the IV resistance (initial resistance) was determined.

[High-Rate Durability Test]

The cell after the initial resistance measurement was subjected to charge/discharge cycle test by applying a charge/discharge pattern in which 10 seconds of discharge at a constant current of 50 A (equivalent to 10 C) was repeated. More specifically, in an environment at 25° C., with one charge/discharge cycle consisting of charging at a constant current of 1 C to 1537 V and discharging at a constant current of 50 A for 10 seconds, the cell was subjected to 10,000 continuous cycles. During this, after every 1,000 cycles, the IV resistance (resistance after cycling) was measured in the same manner as the initial resistance measurement. From the IV resistance after 10,000 charge/discharge cycles and the initial resistance, based on the next formula [(IV resistance after charge/discharge cycles−initial resistance)/initial resistance]×100, the resistance increase rate (%) was determined.

The results obtained are shown in Table 1 along with the summaries of the cells according to the respective examples.

TABLE 1

| Ex. | Inorganic filler/ Li absrober (mass ratio) | Li absrober content (%) | Electrode faced by inorganic porous material layer | Initial capacity (Ah) | Initial resistance (mΩ) | Resistance after cycling (mΩ) | Resistance increase rate (%) |
|---|---|---|---|---|---|---|---|
| 1 | Al$_2$O$_3$ only | — | Negative | 3.22 | 7.89 | 9.63 | 22 |
| 2 | Al$_2$O$_3$/NiO (98/85) | 10 | Negative | 3.13 | 7.71 | 8.71 | 13 |
| 3 | Al$_2$O$_3$/NiO (98/102) | 12 | Negative | 2.79 | 7.64 | 8.40 | 10 |
| 4 | Al$_2$O$_3$/NiO (98/17) | 2 | Negative | 3.23 | 7.86 | 9.27 | 18 |
| 5 | Al$_2$O$_3$/NiO (98/9) | 1 | Negative | 3.22 | 7.90 | 9.48 | 20 |
| 6 | Al$_2$O$_3$/CnF (98/17) | 2 | Negative | 3.21 | 7.91 | 9.25 | 17 |
| 7 | Al$_2$O$_3$/MnO$_2$ (98/17) | 2 | Negative | 3.22 | 7.87 | 9.29 | 19 |
| 8 | MgO/NiO (245/85) | 10 | Negative | 3.12 | 7.73 | 8.89 | 15 |
| 9 | TiO$_2$/NiO (122/85) | 10 | Negative | 3.13 | 7.75 | 8.84 | 14 |
| 10 | NiO only | 10 | Negative | 2.11 | 9.66 | — | — |

TABLE 1-continued

| Ex. | Inorganic filler/ Li absorber (mass ratio) | Li absrober content (%) | Electrode faced by inorganic porous material layer | Initial capacity (Ah) | Initial resistance (mΩ) | Resistance after cycling (mΩ) | Resistance increase rate (%) |
|---|---|---|---|---|---|---|---|
| 11 | Al$_2$O$_3$/NiO (98/85) | 10 | Positive | 3.24 | 7.93 | 9.83 | 24 |

As shown in Table 1, with respect to the cells of Examples 2 to 9 in which the heat-resistant separator having an inorganic porous material layer containing an inorganic filler and a Li absorber on one face of a porous resin sheet (a porous PE sheet herein) had been placed so that the inorganic porous material layers had faced the negative electrode active material layers, all showed lower resistance values after cycling as compared to the cell of Example 1 using no Li absorber. More specifically, the resistance increase rate, which was at 22% in Example 1, was found to have improved (lowered) by about 10 to 55%. With respect to Examples 2, 3 and 6 to 9 in which the Li absorber content was 2% by mass of the positive electrode active material or higher, particularly great effects to improve the resistance increase rate (by about 20% or higher) were obtained. In Example 3 having a Li absorber content at 12% by mass of the positive electrode active material, a decrease in the initial capacity was observed, relative to Example 1. From the standpoint of combining higher-level suppression of the resistance increase and a higher initial capacity, it is preferable that the amount of the Li absorber used is less than 12% by mass (e.g. 11% by mass or less) of the positive electrode active material. In addition, as compared to in the example where magnesia or titania was used as the inorganic filler, in the examples where alumina was used as the inorganic filler, higher initial capacities were obtained in general.

On the other hand, with respect to the cell of Example 10 comprising an inorganic porous material layer containing only NiO (i.e. free of an inorganic filler), the initial capacity decreased significantly as compared to Example 1 and the voltage behavior was also unstable. The cell of Example 10 also had a high initial resistance value and when the cell was disassembled after the initial resistance measurement, it was found that the inorganic porous material layer had significantly peeled off the porous resin sheet. Since such a lack of shape stability was observed in the inorganic porous material layer, the cell according to Example 10 was determined as not worth subjecting to the high-rate durability test.

With respect to the cell according to Example 11 in which the same heat-resistance separator as Example 2 had been placed upside down (so that the inorganic porous material layers had faced the positive electrode), as no effects were observed at all to lower the resistance after cycling or the resistance increase rate, the results were significantly different from the cell according to Example 2. It is noted that the present invention does not rule out putting an inorganic porous material layer comprising an inorganic filler and a Li absorber onto the positive electrode-facing surface of a porous resin sheet, in addition to putting one onto the negative electrode-facing surface of the porous resin sheet. Alternatively, an inorganic porous material layer comprising an inorganic filler and a Li absorber may be provided to the negative electrode-facing surface of a porous resin sheet while an inorganic porous material layer free of a Li absorber may be provided to the positive electrode-facing surface of the porous resin sheet. Similarly to an inorganic porous material layer free of a Li absorber, such an inorganic porous material layer provided on the positive electrode-facing surface of a porous resin sheet may contribute to increase the capability to maintain insulation between positive and negative electrodes. Usually, from the standpoint of reducing the battery's internal resistance, increasing the output properties, increasing the energy density, etc., a constitution not having an inorganic porous material layer on a positive electrode active material layer-facing surface can be preferably employed.

Figure 4:
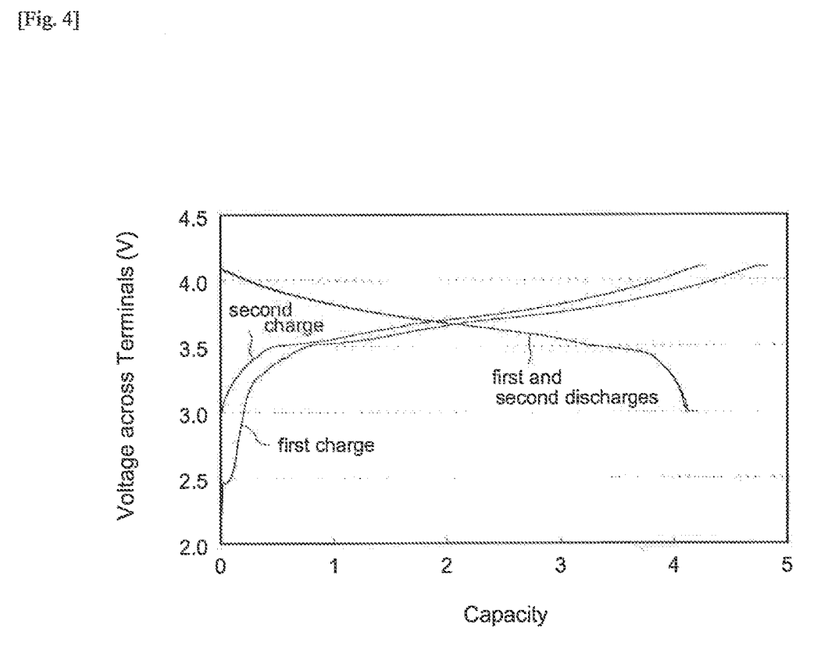
FIG. 4 shows a characteristic diagram showing initial charge/discharge curves of the lithium-ion secondary battery according to Example 2.

With respect to the cell of Example 2, FIG. 4 shows the charge/discharge curves (changes in the voltage across the terminals) during the first measurement (during the initial capacity measurement) and second measurement (during the initial resistance measurement). In the initial phase of the first charge curve, a voltage behavior considered to have arisen from a reaction between NiO and Li was observed. This voltage behavior supports that part of Li from the positive electrode or the electrolyte solution had reacted with the Li absorber (NiO herein) before being intercalated in the negative electrode active material. Such a voltage behavior was not observed in the second charge curve. With respect to the cell of Example 1, both the first and second charge curves behaved similarly to the second charge curve of the cell of Example 4. With respect to the charge curves of the cell of Example 11 in which the Li absorber had been placed on the surface facing the positive electrode active material layer, both the first and second curves behaved similarly to the charge curves of the cell of Example 1. In other words, in the cell of Example 11, no voltage behaviors indicating a reaction between NiO and Li were observed.

While the present invention is described based on preferable embodiments above, these descriptions are not limitations, and various modifications are, of course, possible.

INDUSTRIAL APPLICABILITY

Figure 5:
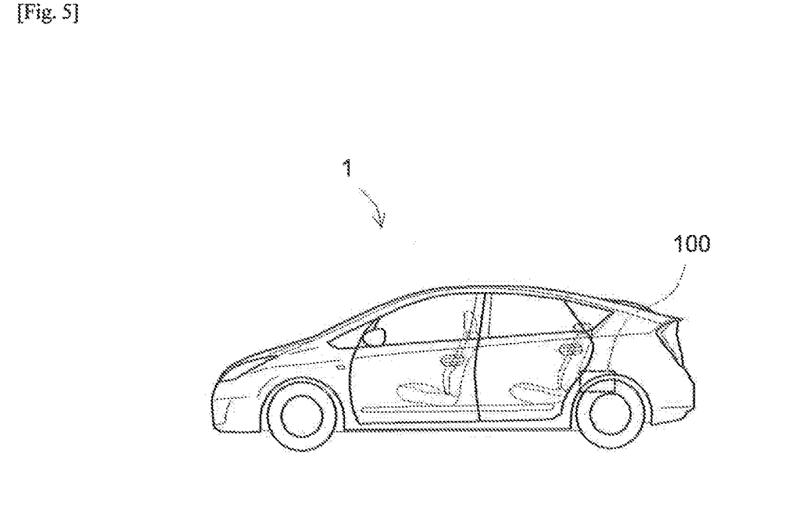
FIG. 5 shows a side view schematically illustrating a vehicle comprising a lithium-ion secondary battery according to an embodiment.

According to the art disclosed herein, it is possible to realize a lithium secondary battery that has excellent durability to high-rate charge/discharge (e.g. excellent cycling properties such as capacity retaining rate, etc.) and is able to maintain a high capacity for a long period of time. Such a lithium secondary battery can be preferably used especially as a power source (driving power supply) for a motor loaded on a vehicle (typically a vehicle comprising an electric motor, such as a plug-in hybrid vehicle (PHV), hybrid vehicle (HV), electric vehicle (EV), fuel cell vehicle (FCV), etc.). Accordingly, the use of a lithium secondary battery disclosed herein as a vehicle-loaded secondary battery (especially as a vehicle-loaded lithium-ion secondary battery) can provide, as shown in FIG. 5, for example, a vehicle 1 comprising a lithium secondary battery 100 (which may be a multi-battery system in which a plurality of the battery 100 are serially connected) as a driving power supply.

REFERENCE SIGNS LIST 10 positive electrode sheet (positive electrode)
10A positive electrode active material layer-free portion 12 positive current collector
14 positive electrode active material layer
20 negative electrode sheet (negative electrode)
20A negative electrode active material layer-free portion
22 negative current collector
24 negative electrode active material layer
30 separator sheet (heat-resistant separator)
32 organic porous material layer (porous resin sheet)
32A first surface (negative electrode-facing surface)
34 inorganic porous material layer
50 battery case
52 main casing
54 lid
72 positive terminal
74 negative terminal
76 positive current collector plate
78 negative current collector plate
80 wound electrode body
100 lithium-ion secondary battery (lithium secondary battery)
132 separator sheet (organic porous material layer)
134 inorganic porous material layer

The invention claimed is:

1. A lithium secondary battery comprising:
    a positive electrode having a positive electrode active material layer;
    a negative electrode having a negative electrode active material layer;
    an organic porous material layer placed between the positive electrode active material layer and the negative electrode active material layer; and
    an inorganic porous material layer placed between the organic porous material layer and the negative electrode active material layer;
    wherein
    the organic porous material layer is a porous resin sheet,
    the positive electrode active material layer comprises a positive electrode active material capable of reversibly storing and releasing lithium, the positive electrode active material layer comprising, as the positive electrode active material, one or more species of lithium transition metal oxide having a layered structure selected from the group consisting of lithium nickel-based oxides, lithium cobalt-based oxides, lithium manganese-based oxides and lithium nickel cobalt manganese oxides,
    the negative electrode active material layer comprises a negative electrode active material capable of reversibly storing and releasing lithium,
    the negative electrode active material is a carbon material having a graphite structure at least partially, and
    the inorganic porous material layer comprises:
    an inorganic filler that does not store lithium at a potential higher than at least the lithium-storing potential of the negative electrode active material, and
    a Li absorber that irreversibly stores lithium at a potential higher than the lithium-storing potential of the negative electrode active material, and wherein
    the Li absorber comprises at least one species selected from carbon fluorides and manganese dioxide,
    the inorganic filler comprises one, two or more species selected from alumina, magnesia and titania,
    the Li absorber content in the inorganic porous material layer is 2 to 10 parts by mass relative to 100 parts by mass of the positive electrode active material and is 10 to 100 parts by mass relative to 100 parts by mass of the inorganic filler, and
    the lithium secondary battery further comprises a non-aqueous electrolyte solution being a liquid phase at room temperature, wherein the non-aqueous electrolyte solution comprises:
    a non-aqueous solvent, and
    a lithium compound as a supporting electrolyte which is soluble in the solvent to supply lithium ions.

2. The battery according to claim 1, wherein the inorganic porous material layer is retained on a negative electrode-facing surface of the organic porous material layer.

3. A method for producing the lithium secondary battery according to claim 2, comprising:
    obtaining a mixture comprising the inorganic filler and the Li absorber,
    applying the mixture to at least a first surface of a porous resin sheet as the organic porous material layer to form a heat-resistant separator in which the inorganic porous material layer is retained on the first surface; and
    constructing the lithium secondary battery with the positive electrode, the negative electrode and the heat-resistant separator, wherein the heat-resistant separator is placed so that the first surface faces the negative electrode.

4. A vehicle comprising the lithium secondary battery according to claim 1 as a vehicle-driving power supply.

5. A lithium secondary battery, comprising:
    a positive electrode having a positive electrode active material layer;
    a negative electrode having a negative electrode active material layer;
    an organic porous material layer placed between the positive electrode active material layer and the negative electrode active material layer; and
    an inorganic porous material layer placed between the organic porous material layer and the negative electrode active material layer;
    wherein
    the organic porous material layer is a porous resin sheet,
    the positive electrode active material layer comprises a positive electrode active material capable of reversibly storing and releasing lithium, the positive electrode active material layer comprising, as the positive electrode active material, one or more species of lithium transition metal oxide having a layered structure selected from the group consisting of lithium nickel-based oxides, lithium cobalt-based oxides, lithium manganese-based oxides and lithium nickel cobalt manganese oxides,
    the negative electrode active material layer comprises a negative electrode active material capable of reversibly storing and releasing lithium,
    the negative electrode active material is a carbon material having a graphite structure at least partially, and
    the inorganic porous material layer comprises:
    an inorganic filler that does not store lithium at a potential higher than at least the lithium-storing potential of the negative electrode active material, and
    a Li absorber that irreversibly stores lithium at a potential higher than the lithium-storing potential of the negative electrode active material, and wherein
    the Li absorber comprises nickel oxide (NiO),
    the inorganic filler comprises one, two or more species selected from alumina, magnesia and titania,
    the Li absorber content in the inorganic porous material layer is 2 to 10 parts by mass relative to 100 parts by mass of the positive electrode active material and is 10 to 100 parts by mass relative to 100 parts by mass of the inorganic filler, and the lithium secondary battery further comprises a non-aqueous electrolyte solution being a liquid phase at room temperature, wherein the non-aqueous electrolyte solution comprises:

a non-aqueous solvent, and a lithium compound as a supporting electrolyte which is soluble in the solvent to supply lithium ions.

6. The battery according to claim 5, wherein the inorganic porous material layer is retained on a negative electrode-facing surface of the organic porous material layer.

7. A method for producing the lithium secondary battery according to claim 6, comprising:

obtaining a mixture comprising the inorganic filler and the Li absorber, applying the mixture to at least a first surface of a porous resin sheet as the organic porous material layer to form a heat-resistant separator in which the inorganic porous material layer is retained on the first surface; and constructing the lithium secondary battery with the positive electrode, the negative electrode and the heat-resistant separator, wherein the heat-resistant separator is placed so that the first surface faces the negative electrode.

8. A vehicle comprising the lithium secondary battery according to claim 5 as a vehicle-driving power supply.

9. The battery according to claim 1, wherein the inorganic filler is in a powder form with an average particle diameter of 0.4 μm to 2 μm.

10. The battery according to claim 5, wherein the inorganic filler is in a powder form with an average particle diameter of 0.4 μm to 2 μm.

11. The battery according to claim 1, wherein the Li absorber is in powder form with an average particle diameter of 0.4 μm to 2 μm.

12. The battery according to claim 5, wherein the Li absorber is in powder form with an average particle diameter of 0.4 μm to 2 μm.

* * * * *